United States Patent [19]

Medley, Jr.

[11] Patent Number: 4,695,026
[45] Date of Patent: Sep. 22, 1987

[54] HOLDER FOR EYE GLASSES

[76] Inventor: Travis D. Medley, Jr., 1551 Brenner Way, San Jose, Calif. 95118

[21] Appl. No.: 835,156

[22] Filed: Mar. 3, 1986

[51] Int. Cl.$^4$ ................................................. A47F 5/00
[52] U.S. Cl. .................................. 248/316.5; 211/89; 248/DIG. 2; D8/373
[58] Field of Search ........... 248/316.5, DIG. 2, 309.1, 248/316.1; D3/34; D8/373, 254; D16/129; 211/89, 8, 13

[56] References Cited

U.S. PATENT DOCUMENTS

| D. 178,995 | 10/1956 | Glover | D16/129 |
| 2,467,251 | 4/1949 | Bowman | 248/DIG. 2 X |
| 2,949,683 | 8/1960 | Glover | 248/309.1 X |
| 2,958,495 | 11/1960 | Foster | 248/309.1 X |
| 3,259,348 | 7/1966 | Dann | 248/DIG. 2 X |
| 4,128,224 | 12/1978 | Guichard | 248/DIG. 2 X |

FOREIGN PATENT DOCUMENTS

| 2951942 | 7/1981 | Fed. Rep. of Germany | 248/DIG. 2 |
| 827869 | 2/1960 | United Kingdom | 248/316.5 |

Primary Examiner—J. Franklin Foss
Assistant Examiner—David L. Talbott
Attorney, Agent, or Firm—Gerald L. Moore

[57] ABSTRACT

An eye glass holder comprising a base member (18) having attached thereto a support member (19) and a clamping member (24). The support member is formed to receive the eye glass nose piece (15) and the clamping member is biased towards the support member such that eye glasses (10) can be placed on the support member and the clamping member moved into contact to hold the glasses in place. Means such as double sided tape (36) is provided for attachment of the base member to a surface.

4 Claims, 5 Drawing Figures

U.S. Patent    Sep. 22, 1987    4,695,026
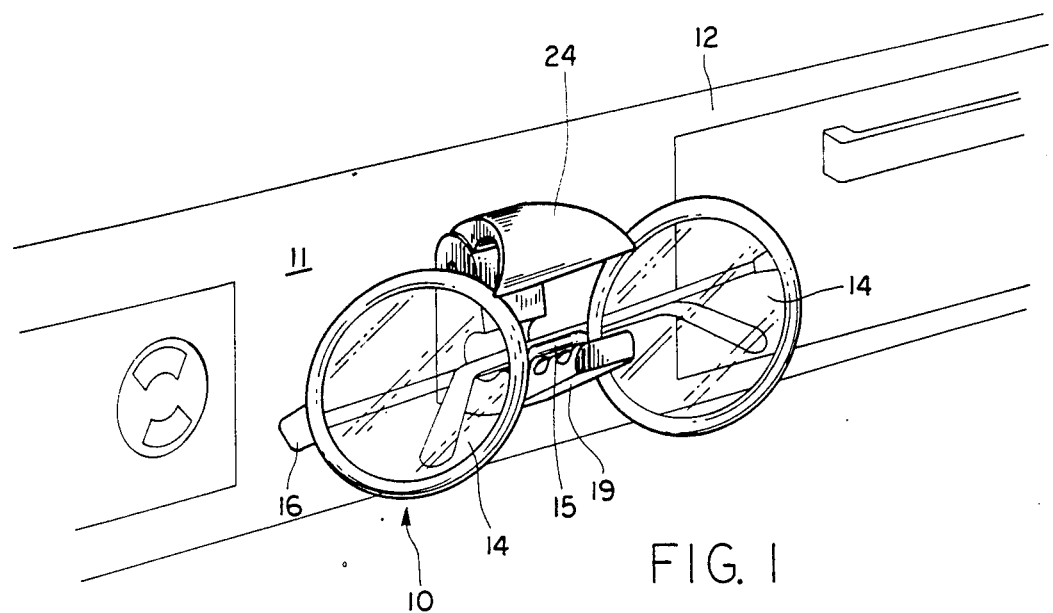
FIG. 1
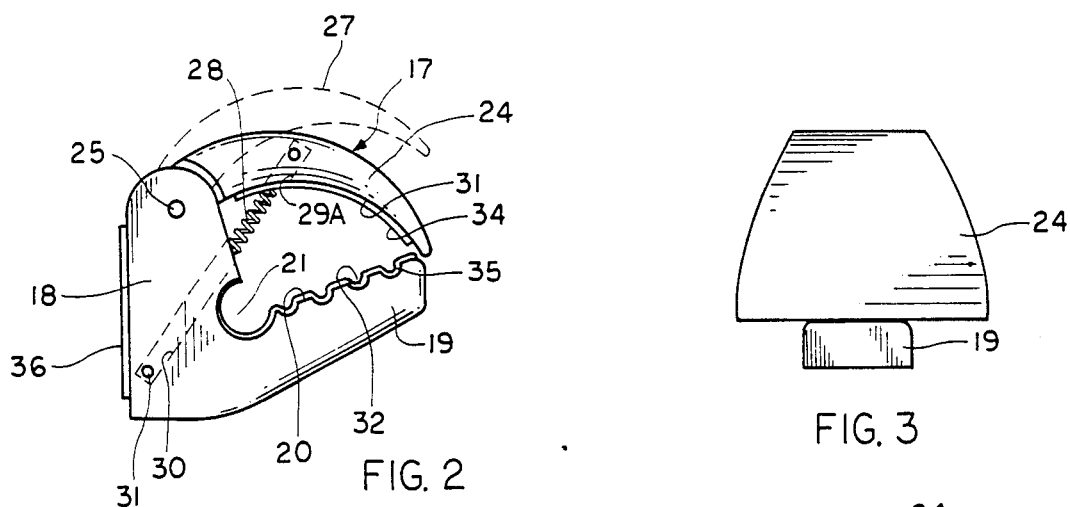
FIG. 2
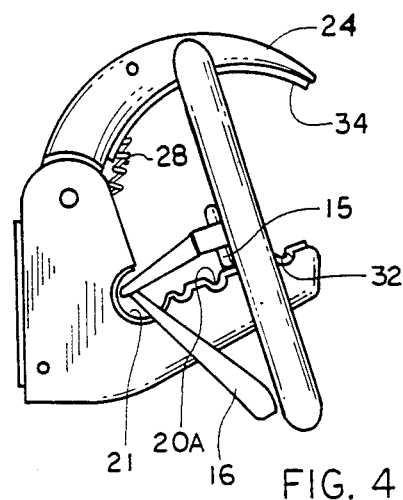
FIG. 3
FIG. 4
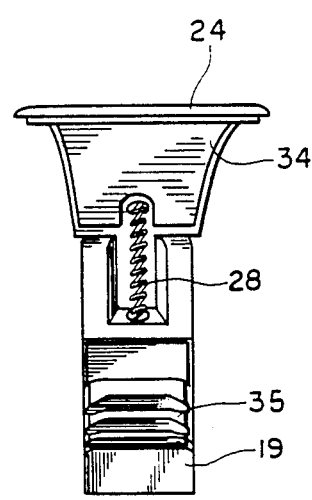
FIG. 5

4,695,026

HOLDER FOR EYE GLASSES

FIELD OF THE INVENTION

This invention relates to an eye glass holder that can be attached to a stationary object such as an automobile dashboard.

BACKGROUND OF THE INVENTION

Many people have more than one pair of eye glasses and use each during certain special situations. For instance, sun glasses are frequently removed and must be stored when the user is in an automobile, on the golf course, etc. Additionally, other glasses are only used for reading or for viewing far away objects but not at other times.

When not used it is important to store eye glasses in a manner so that they are available and are protected. The safe storage becomes more important with the rise in prices of eye glasses. It is the purpose of the present invention to provide a device which can be attached to automobile dashboards, golf bags, and the like for releasably holding eye glasses in a safe yet accessible manner.

SUMMARY OF THE INVENTION

An eye glass holder comprising a base member including means for attachment to a wall member, said base member including a bottom support member fixed thereto for receiving the nose piece of eye glasses. A clamping member is pivotally fixed to the top of the base member and includes an extending end which is movable towards and away from the bottom support, with spring means for biasing the clamping member towards the support member whereby eye glasses can be placed on the support member and the clamping member lowered into contact therewith for holding the eye glasses adjacent the base member between the support member and the clamping member.

DESCRIPTION OF THE DRAWINGS

FIG. 1 is a prospective view of the eye glass holder fixed to an automobile dashboard;

FIG. 2 is a side view of the holder;

FIG. 3 is a front view of the holder;

FIG. 4 shows a side view of the holder with eye glasses inserted; and

FIG. 5 shows a front view of the holder with the clamping member opened in a manner to allow eye glasses to be placed therein.

DESCRIPTION OF A PREFERRED EMBODIMENT

As shown in FIG. 1 the invention is for holding eye glasses 10 and can be fastened to a substantially flat surface such as the vertical surface 11 forming a part of an automobile dash 12. The eye glasses are the standard folding type having lenses 14, a nose piece 15, and folding ear pieces 16.

The holder 17 comprises a base member 18 which, in the embodiment shown, has attached means for fastening the holder to a planar member as shown in FIG. 1. Fixed to the base member 18 is a bottom support member 19 forming a top surface 20 which is scalloped to form cross grooves 20a for receiving the nose piece 15 of the eye glasses. At the joint between the base member and the bottom support is formed a semi-circular opening 21 for receiving the ear pieces of the glasses.

A clamping member 24 is attached at one end by a pin 25 extending through the end of the base member the furthest from the bottom support such that the clamping member extends in the same direction from the base member as the bottom support and can be pivoted upward to the dotted line position 27 shown in FIG. 2. A tension spring 28 extends into a well 29a in the bottom surface of the clamping member and is held there by a pin 29. The extending end of the spring extends through a hole 30 to a pin 31 in the base member. Thus, the clamping member is biased in the clockwise direction towards the bottom support 19. The inner surface 31 of the clamping member and the grooves in the surface 32 of the bottom support has fixed thereto a foam layer 34 and 35 respectively, to protect the glasses and prevent slippage within the holder.

In use, the holder is fixed to a flat surface 11 and the clamping member is raised such that the eye glasses 10 can be placed therein in the position shown in FIGS. 1 and 4. The nose piece 15 rests on the bottom support 19 in one of the grooves 20a while the ear pieces 16 extend within the semi-circular opening 21. The clamping member is then released to press down on the top of the eye glasses and hold them firmly in place. The grooves 20a prevent the eye glasses from moving within the holder. The holder can be fixed to any type of flat surface such as an automobile dash surface by means as double sided tape 36 or a screw passed through the base member 18.

I claim:

1. An eye glass holder for holding eye glasses having a pair of lenses connected by a nose piece and having attached a pair of ear pieces, said holder comprising:
    a base member having first and second ends,
    a support member fixed to the first end of said base member and formed to extend from said base member and receive the nose piece of the eye glasses and forming at the juncture with said base member an enlarged opening to receive the sun glass earpieces,
    a clamping member pivotally attached to the second end of said base member to extend in the same direction as said support member and positioned to contact and clamp the eye glasses against said support member, and
    means biasing said clamping member towards said base member whereby the eye glasses can be placed with the nose piece on said support member and the earpieces in said enlarged opening and the clamping member moved into contact therewith to hold said eye glasses.

2. An eye glass holder as defined in claim 1 wherein said support member includes grooves to receive and hold said eye glass nose piece.

3. An eye glass holder as defined in claim 1 including a spring extending between said clamping member and said base member to bias the clamping member towards said support member.

4. An eye glass holder as defined in claim 1 wherein said base member includes means for attachment to a surface.

* * * * *